United States Patent [19]

Hehl

[11] Patent Number: 4,608,008
[45] Date of Patent: Aug. 26, 1986

[54] PARTS DISCHARGE CONVEYOR FOR INJECTION MOLDING MACHINE

[76] Inventor: Karl Hehl, Arthur-Hehl-Strasse 32, 7298 Lossburg 1, Fed. Rep. of Germany

[21] Appl. No.: 709,730

[22] Filed: Mar. 8, 1985

[30] Foreign Application Priority Data

Mar. 8, 1984 [DE] Fed. Rep. of Germany ....... 3408459
Aug. 16, 1984 [DE] Fed. Rep. of Germany ....... 3430032

[51] Int. Cl.$^4$ ................................................ B29F 1/14
[52] U.S. Cl. .................................. 425/542; 425/151; 425/403.1; 425/556; 198/835
[58] Field of Search ............ 198/834, 835, DIG. 950; 425/151, 403.1, 542, 556

[56] References Cited

U.S. PATENT DOCUMENTS

| | | | |
|---|---|---|---|
| 3,122,945 | 3/1964 | Chung | 198/835 X |
| 3,160,919 | 12/1964 | Carter | 425/151 |
| 3,986,811 | 10/1976 | Gunnels | 425/556 |
| 4,005,773 | 2/1977 | Bouille | 198/835 X |
| 4,013,166 | 3/1977 | Weady et al. | 198/835 |

Primary Examiner—J. Howard Flint, Jr.
Attorney, Agent, or Firm—Joseph A. Geiger

[57] ABSTRACT

A conveyor means including axles 14, on which the drums 17 for an endless conveyor belt 18 are rotatably mounted, and which extend within a chassis. The chassis includes a core 10 disposed between the upper and lower belt runs 18a, 18b of the conveyor belt 18 and between the drums 17, and two side walls 11 which are secured to the longitudinal sides of said core. A hydraulic drive motor is disposed between the belt runs 18a, 18b and extends parallel to a drum 17. This arrangement permits the conveyor means to be a compact, structural unit which can be completely assembled externally of the machine base, can be tested for reliable running and can then be inserted into the narrow discharge passage of the machine base.

12 Claims, 10 Drawing Figures

PARTS DISCHARGE CONVEYOR FOR INJECTION MOLDING MACHINE

BACKGROUND OF THE INVENTION

1. Field of the Invention

The present invention relates to a conveyor means mountable on a plastics material injection moulding machine for discharging from the machine base the mouldings which fall from the injection moulding die in, said conveyor means including an endless conveyor belt; two drums which are rotatably mounted on stationary axles and serve as guide members for the conveyor belt, said axles being mounted within a frame or chassis which includes a core disposed between the runs of the conveyor belt and between the drums; and two side walls which are secured to the longitudinal sides of said core.

2. Description of the Prior Art

Conventional conveyor means are known which are incorporated in the machine base of the plastics material injection moulding machine and cannot be removed from the machine base without considerable dismantling (German Pat. No. 3 2 38 185). The drums of such conventional conveyor means are supported in the walls of the machine base or are mounted in a frame which is connected to the machine base and takes up space all around. Such an arrangement presupposes a relatively large amount of assembly work.

Conveyor means of a comparable type are also known which can be manufactured in a very compact manner from standard components according to the mechanical assembly technique (Journal entitled "Transport und Lagertechnik" 11/75.)

SUMMARY OF THE INVENTION

The present invention seeks to provide a conveyor means so that, with improved pre-requisites for rational mass-production, such a conveyor means is a space-saving, structural unit which can be completely assembled externally of the machine base, can be tested for reliable running and can then be inserted into the relatively narrow discharge passage of the machine base.

According to the present invention, there is provided a conveyor means mountable in a plastics material injection moulding machine for discharging from the machine base the mouldings which fall from the injection moulding die, said conveyor means including an endless conveyor belt which is disposable in the machine base; two drums which are rotatably mounted on stationary axles and serve as guide members for the conveyor belt, said axles being mounted within a frame or chassis which includes a core disposed between the runs of the conveyor belt and between the drums; and two side walls which are secured to the longitudinal sides of said core; wherein the drive motor is a hydraulic motor which is disposed between the runs of the belt and the side walls, said motor extending parallel to a drum and being supported on an axle by means of a supporting arm, the axle being non-rotatably mounted on the chassis, said supporting arm surrounding the said axle by means of bearing portion and a centering projection of the hydraulic motor by means of bearing flange.

In such an arrangement, the conveyor means is provided with an extremely space-saving construction and, after an external test run, the conveyor means may be adapted to vertically adjustable bearing rods in the machine base since its maximum width is determined by the spacing between its side walls and substantially corresponds to the width of the discharge aperture in the machine base. Due to the operating characteristics of the hydraulic motor, the conveyor belt may be selectively run at different speeds, either continuously or discontinuously.

In one embodiment horizontal tensioning screw means are supported on the chassis and are in threaded engagement with the adjacent axle, the journals of said axle being guidable in horizontal guide notches provided in the chassis for the tensioning of the conveyor belt, the associated tensioning bolt extending through the bush-like bearing member of the supporting arm, and the bearing flange abutting against the end face of the hydraulic motor. A toothed drive wheel is disposed coaxially with the hydraulic motor, meshes with a toothed wheel disposed on an end face of the adjacent drum.

In an arrangement wherein, with respect to the chassis, the drums, the axles, the conveyor belt and the tensioning devices said conveyor means is constructed in symmetry with two planes which extend vertically to each other; three functionless drum spur wheels being axially secured by means of spacer bushes, the axial dimension of said spacer bushes corresponding to the axial dimension of the bearing portion of the supporting arm. The core is formed from profiled bars which extend transversely to the conveying direction, and the core is formed from two cover plates which extend in parallel planes and abut against the profiled bars, the hydraulic motor being disposed between a drum and a profiled bar. In this arrangement the conveyor means may be made in different sizes from standardised components.

In a development of the invention, an additional conveyor means is formed from component parts which are identical to the corresponding component parts of the first mentioned conveyor means which is connected to the additional conveyor means via parallel bearing plates which abut against the faces of the side walls of the first conveyor means and against the faces of the side walls of the additional conveyor means. A closing-off plate is pivotably mounted above the drum of the additional conveyor means and tangentially abuts against the conveyor belt under the action of gravity in the deflection region thereof. Thus the mouldings which are discharged from the machine base may be raised to a higher level without the need for an additional drive means.

BRIEF DESCRIPTION OF THE DRAWINGS

The invention will be described further, by way of example, with reference to the accompanying drawings, in which.

DESCRIPTION OF THE PREFERRED EMBODIMENTS

Figure 1:
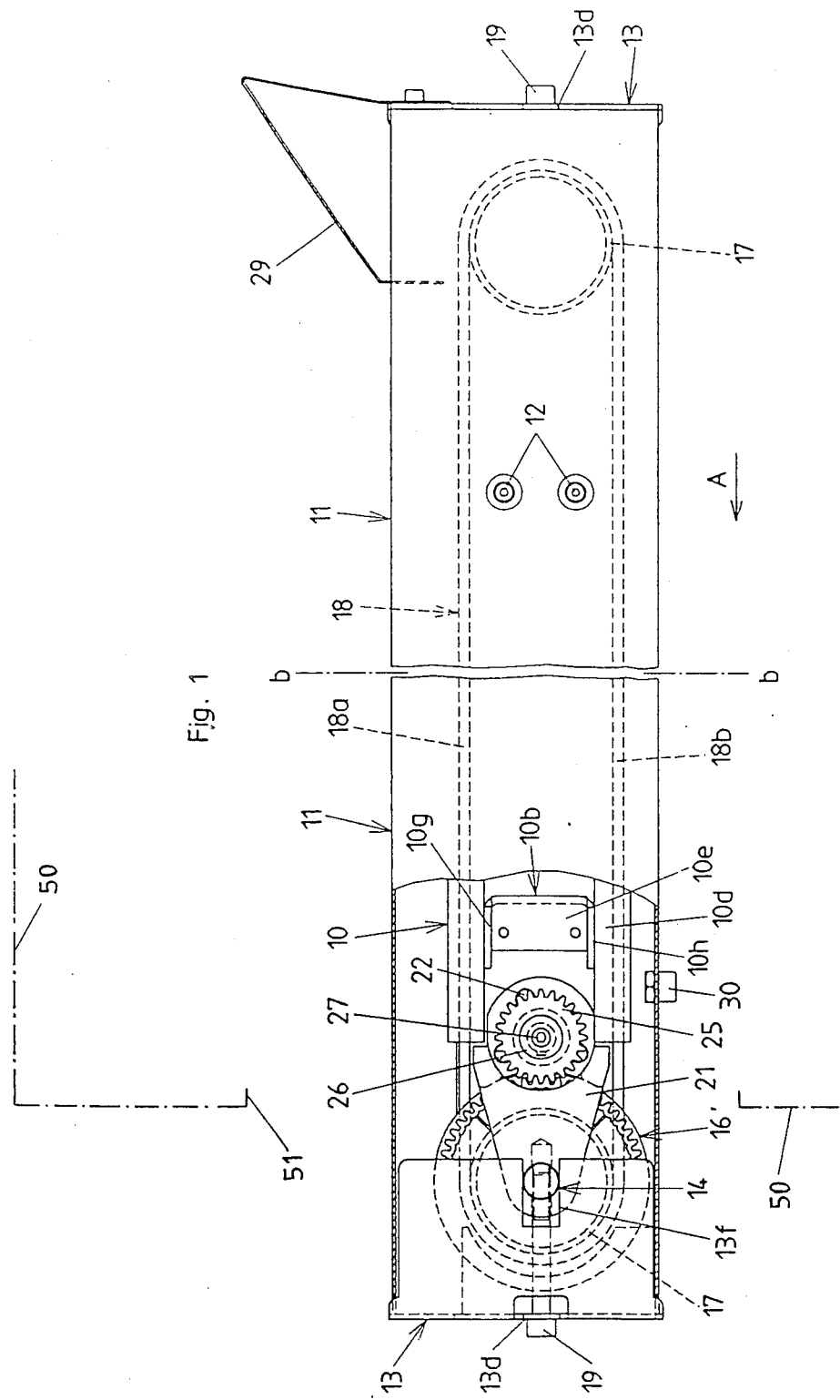
FIG. 1 is a side elevational view with a partially cutaway wall portion of an end of a conveyor means forming an embodiment of the invention.

The conveyor means of FIGS. 1 to 7 includes a frame or chassis comprising a core 10 and two side walls 11 which are secured to the longitudinal sides of said core and are provided with end plates 13. The core 10 is disposed between the upper and lower runs 18a and 18b of an endless conveyor belt 18 and between rollers or drums 17. The core 10 is formed from a plurality of profiled bars 10b, which have a U-shaped cross-section and extend transversely to the conveying direction indicated by arrow A, and the core is also formed from two cover sheets or plates 10a which extend in parallel planes. The cover plates 10a abut against the planar U-shaped legs 10g and 10h of the profiled bars 10b. The side walls 11, which extend over the entire length of the conveyor means, have a planar, vertical web region 11e, an upper inwardly-curved longitudinal edge 11b and a lower horizontally- and inwardly-curved longitudinal edge 11a which forms a bearing surface for supporting the conveyor means. The longitudinal edge 11b is provided with a flange 11f. The two longitudinal edges 11a and 11b extend slightly over the conveyor belt 18. The side walls 11 are secured, by their web regions 11e, to bent-over web flaps 10e of the profiled bars 10b by means of screw-bolts 12, the heads of which are countersunk in stamped recesses or indentations 11c and engage in bores 10f formed in the web flaps 10e. The side walls 11 abut against the vertical flanges 10d of the cover plates 10a and are thereby reinforced. The end plates 13 have a U-shaped cross-section and abut against the end regions of the longitudinal edges 11a and 11b of the side walls 11. The end plates 13 abut, with a U-shaped leg 13b, against the inner surface of the web region 11e of the adjacent side wall 11 and are prevented from effecting lateral displacement by projection members 13e. The projection members 13e protrude upwardly and downwardly beyond the U-shaped legs 13b and engage in notches 11d formed in the longitudinal edges 11b and 11a, respectively. The U-shaped legs 13a support the longitudinal edges 11a and 11b from internally for reinforcing purposes.

Figure 2:
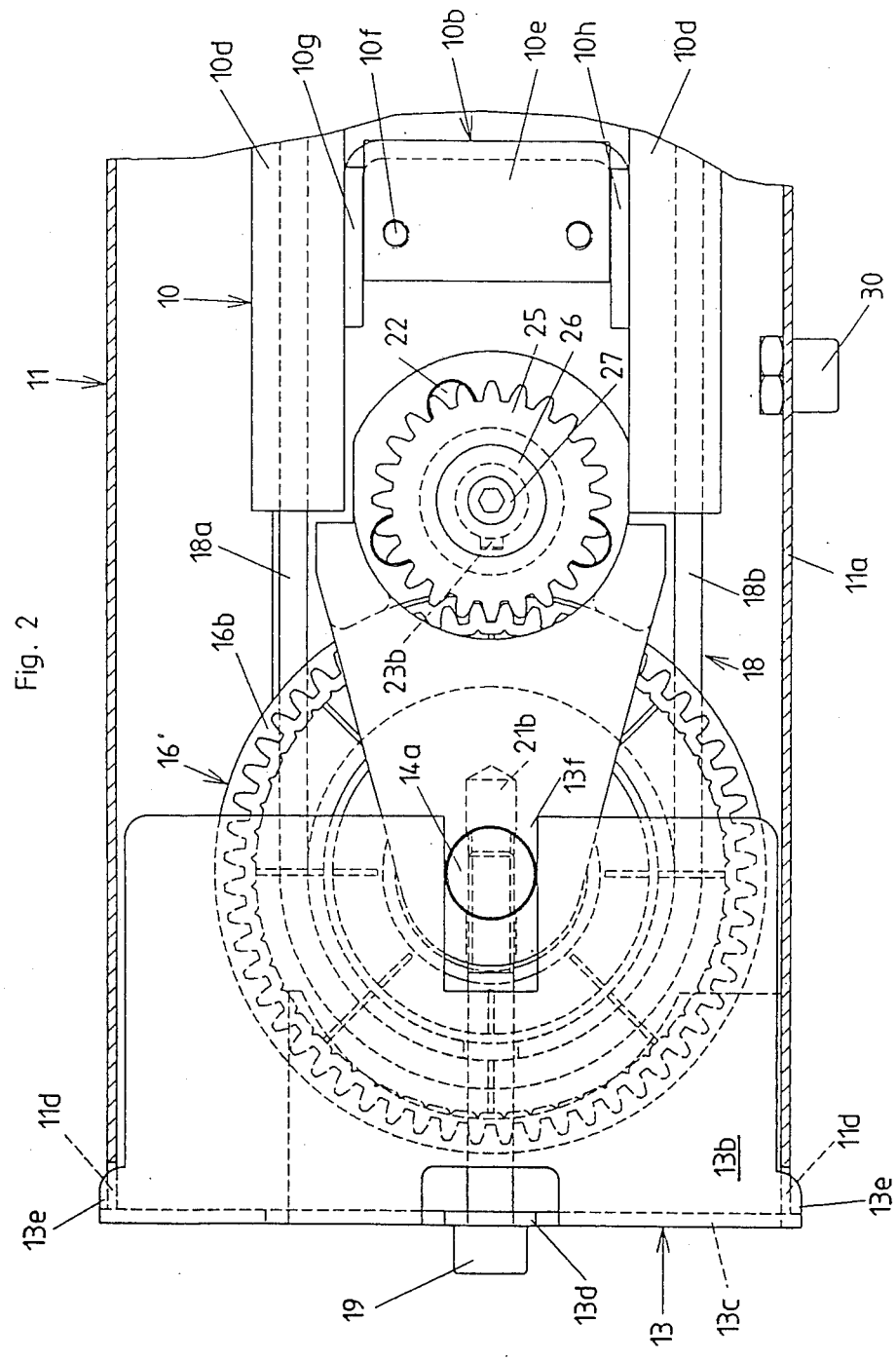
FIG. 2 is an enlarged detail of the cutaway portion of FIG. 1.
Figure 3:
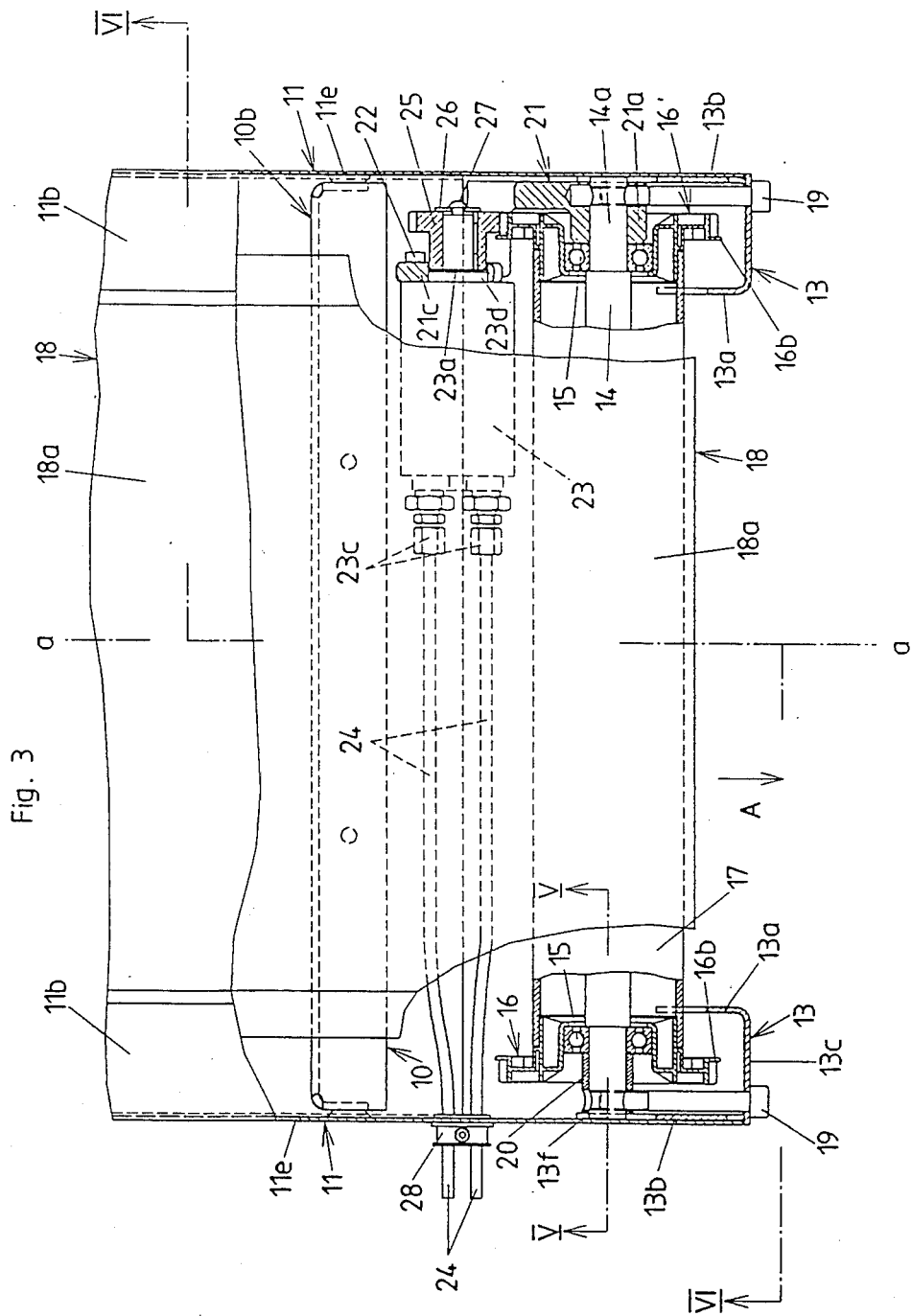
FIG. 3 is a plan view of the discharge end of the conveyor means of FIG. 1 with end corner portions thereof being cut open and wherein the cover plates of the core have been omitted for clarity.
Figure 4:
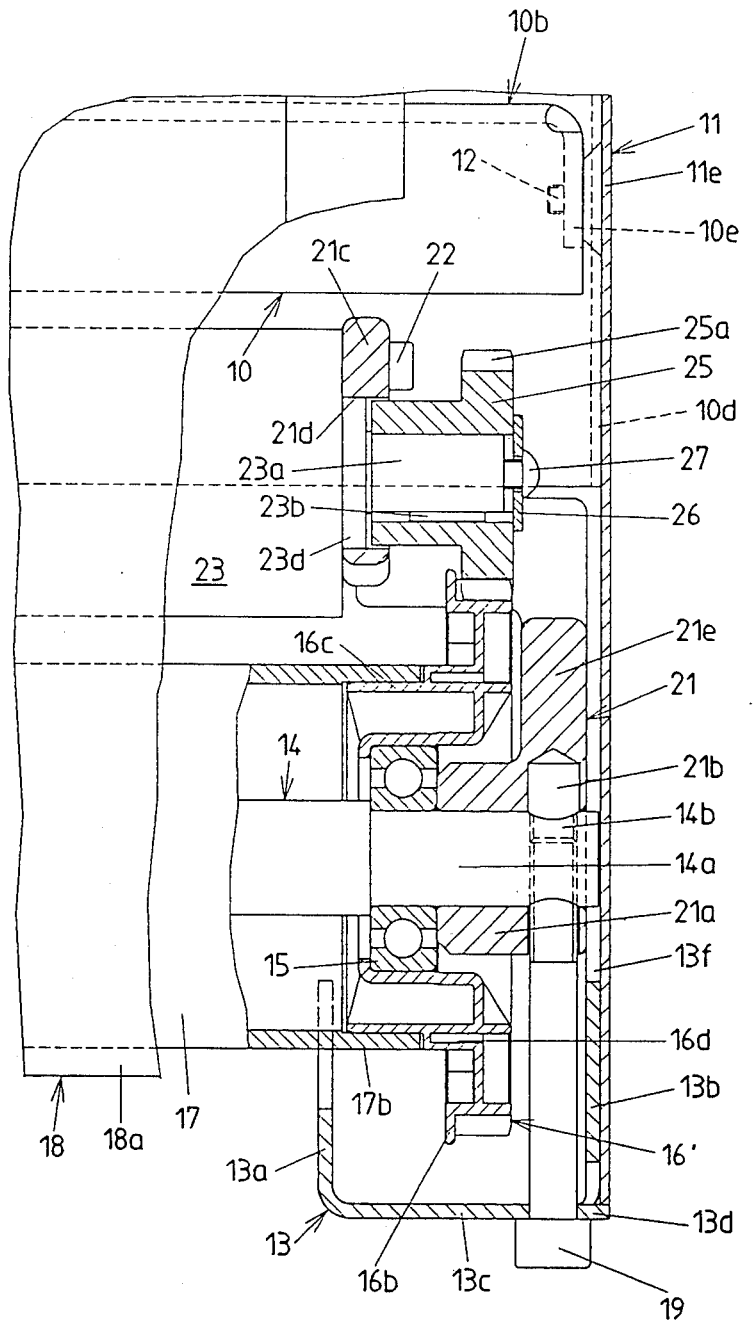
FIGS. 4 and 5 are enlarged detailed sectional views of the cut open end portions of FIG. 3.
Figure 5:
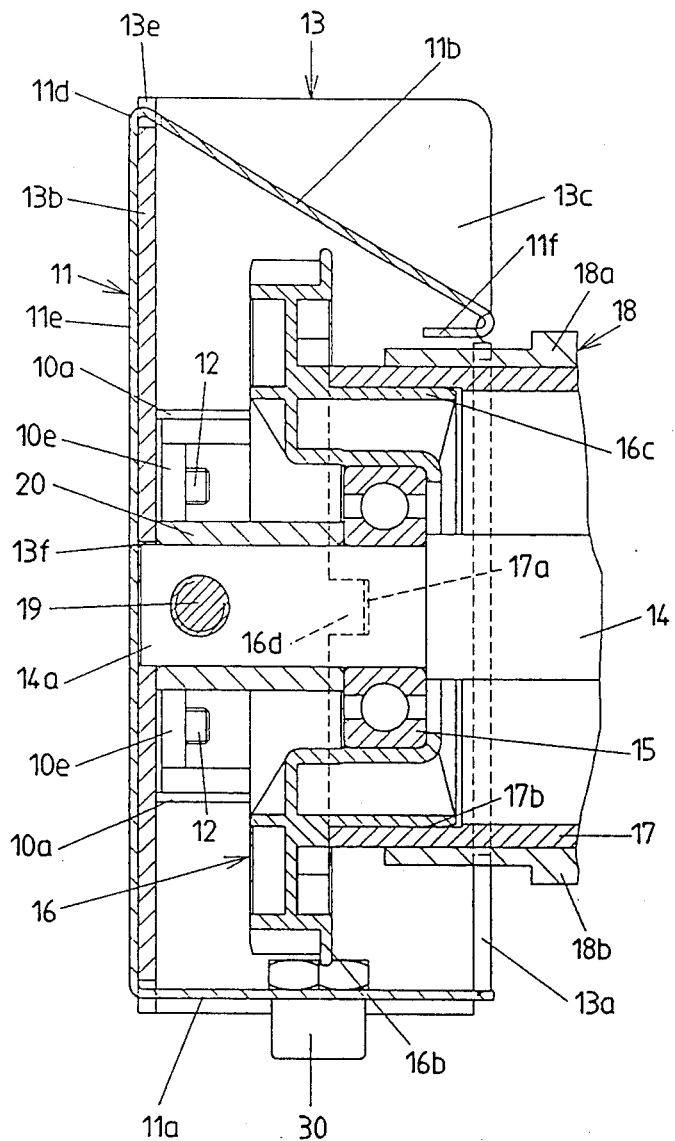
Figure 6:
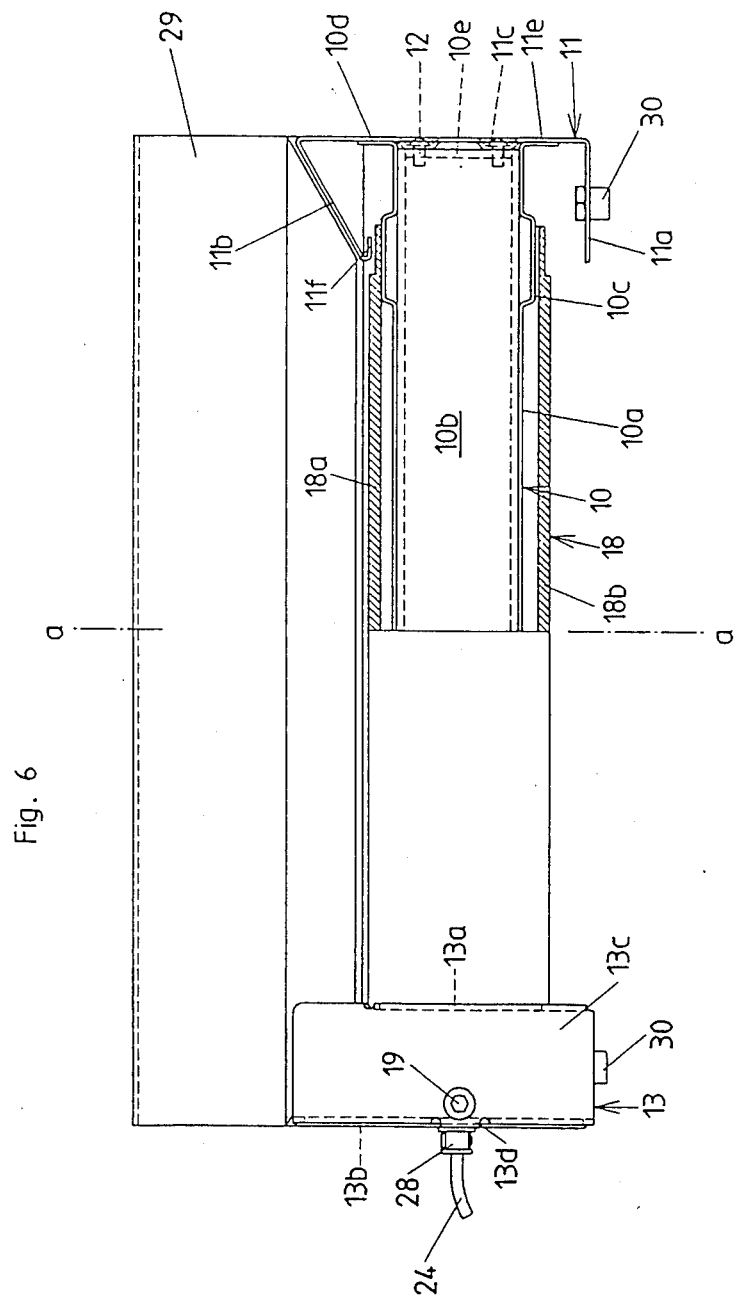
FIG. 6 is a sectional view taken along the line VI—VI of FIG. 3 with resultant part end view of part vertical section.
Figure 7:
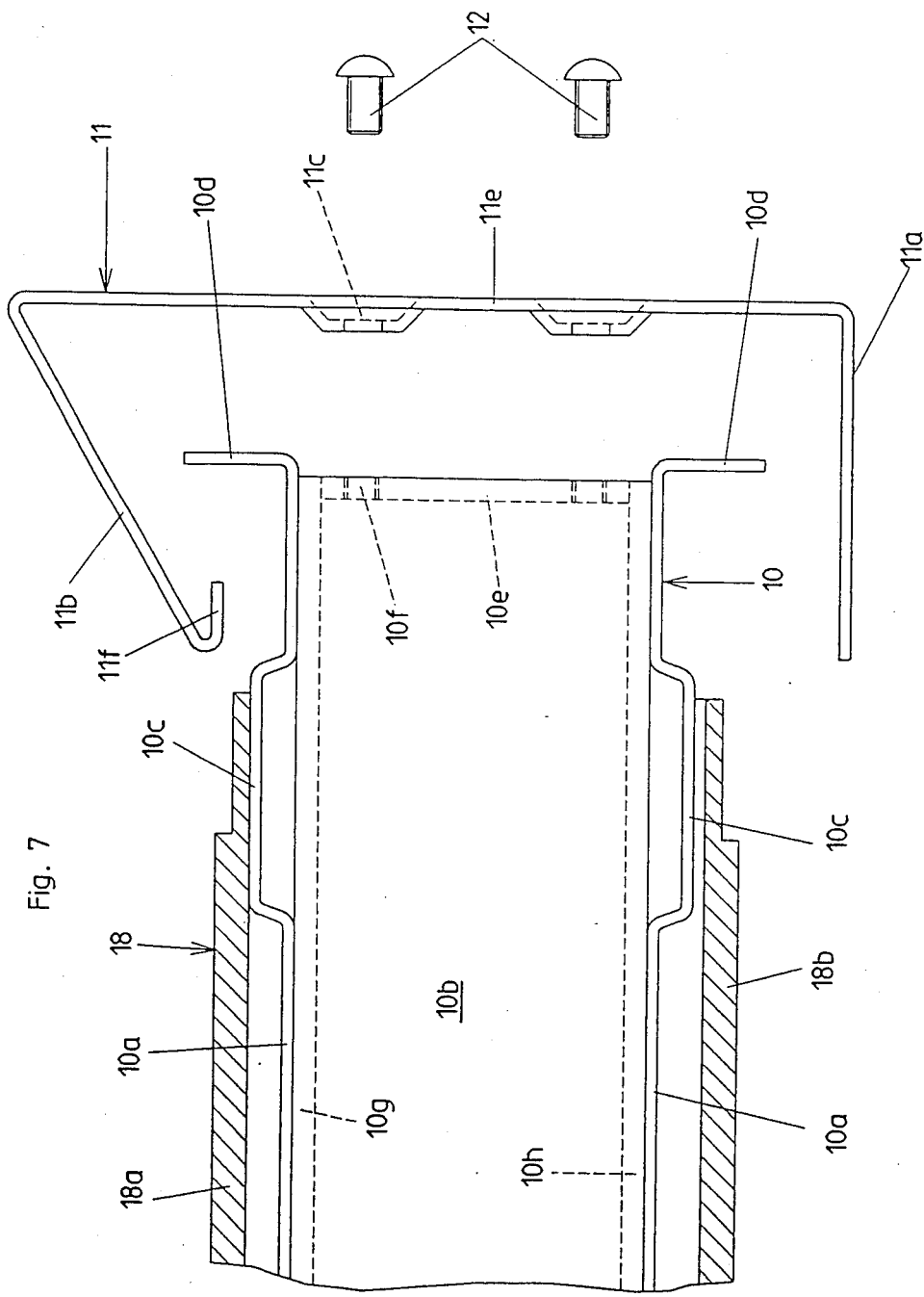
FIG. 7 is an enlarged detail of FIG. 6 with the side wall being laterally displaced.

The drums 17 are mounted on stationary axles 14, which are supported in the side walls 11. For the formation of tensioning devices 14 and 19 for tensioning the belt, horizontal tensioning bolts 19 are supported on the end faces or webs 13c of the end plates 13 and are in engagement with the adjacent axle 14 via transverse bores 14b. Journals 14a of axles 14 are mounted in horizontal guide notches 13f formed in the U-shaped legs 13b and guided during tensioning of the conveyor belt 18. For stabilising purposes, support flaps 13d of the end plates abut, in each case, against the respective end region of the adjacent side wall 11 (FIGS. 2 and 4). A hydraulic motor 23 is supported on an axle 14 in a freely supported manner by means of a supporting arm 21. The supporting arm 21 embraces, on the one hand, the journal 14a of said axle by means of bearing member or portion 21a and, on the other hand, a centering projection or spigot 23d of the hydraulic motor 23 by means of bearing flange 21c. The tensioning bolt 19 partially extends through the bush-like bearing portion 21a which is provided with an aperture 21b. The bearing flange 21c abuts against the end face of the hydraulic motor 23. A coaxial toothed drive wheel 25 of the hydraulic motor 23 meshes with a toothed wheel (drum spur wheel 16') disposed on the end face of the adjacent drum 17. The drums 17 are supported on the axles 14 by means of ball bearings 15 and are non-rotatably connected to their drum spur wheels 16 in such a manner that they engage with their end portions 17b over the hubs 16c of the drum spur wheels 16 and so that at least one axial projection 16d engages in an appropriate notch 17a formed in the drum (FIG. 5). An upper end belt run 18a is slidably supported on longitudinal channels 10c of the adjacent cover plate 10a. A guide plate 29 is provided on the rear end of the conveyor means. With respect to the chassis, the drums 17, the axles 14 and the conveyor belt 18, the conveyor means is constructed in symmetry with two vertical planes of symmetry a-a; b-b which extend perpendicularly to each other. To maintain the symmetry which is advantageous for manufacture, three functionless drum spur wheels 16 are provided which are disposed in the same manner as the driven drum spur wheel 16'. The functionless drum spur wheels 16 are axially secured by means of spacer bushes 20, the axial dimension of said spacer bushes corresponding to the axial dimension of the bearing portion 21a of the supporting arm 21. The hydraulic motor 23, which is secured to the bearing flange 21c by means of securing screws or bolts 22, is connected to the hydraulic circuit of the injection moulding machine via hydraulic connections 23c and hydraulic lines 24. The hydraulic leads are secured by a hose holder 28. Toothed drive wheel 25 is non-rotatably connected to the journal 23a of the hydraulic motor 23 by means of a key 23b and axially secured by means of screw or bolt 27 via a washer or supporting disc 26. An annular shoulder 21d of the bearing flange 21c, which is moulded with a bridge member 21e, centres the hydraulic motor 23.

The conveyor means reaches through an opening 51 of the machine base 50, resting on vertically adjustable transverse rods of the machine base via the longitudinal edges 11a and is prevented from becoming displaced by means of a stop 30 bolt (FIG. 2). Annular shoulders 16b of the drum spur wheels 16 and 16', laterally guide of the conveyor belt 18.

Figure 8:
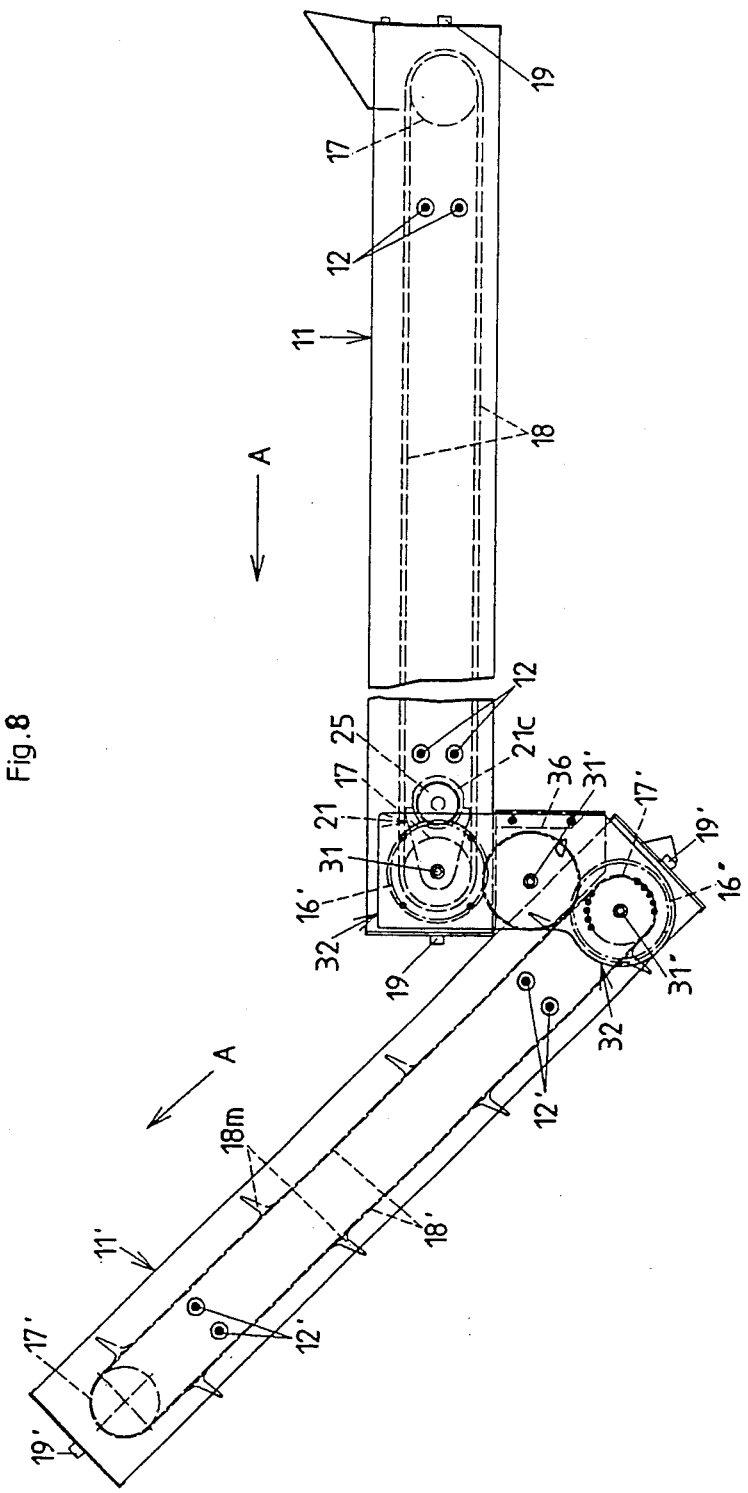
FIG. 8 is a side elevational view showing the first mentioned conveyor means and an additional conveyor means comprising an alternative embodiment of the invention.
Figure 9:
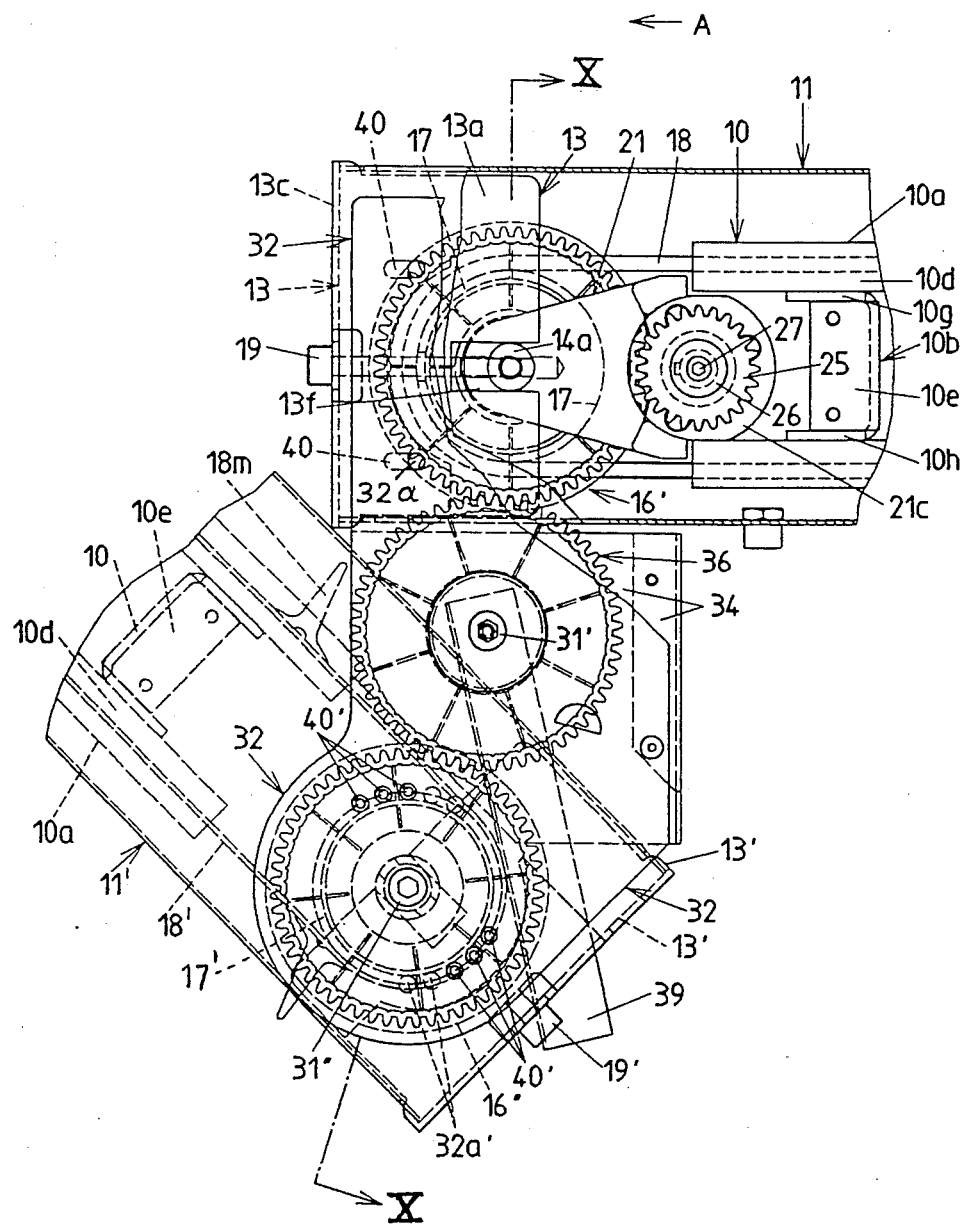
FIG. 9 illustrates a portion of the conveyor means shown in FIG. 8 with the side, or respectively the bearing plate, partially cut open.
Figure 10:
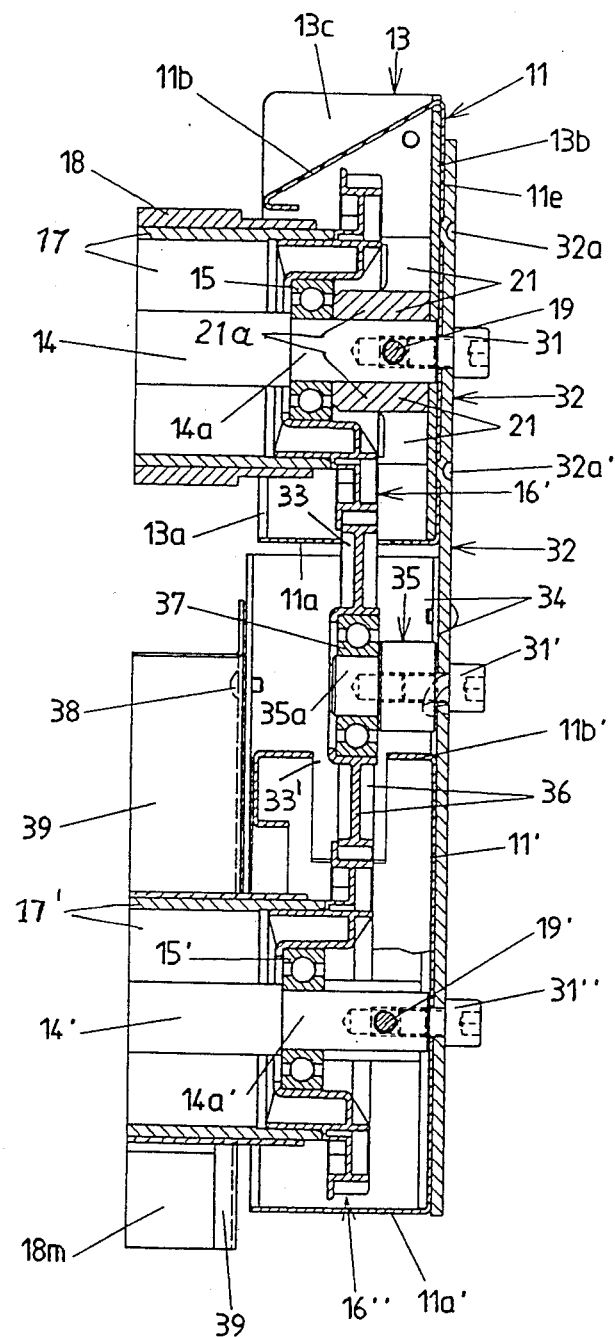
FIG. 10 is a sectional view of the arrangement shown in FIG. 9, taken along the line X—X.

In the alternative arrangement illustrated in FIGS. 8 to 10, the core 10 of the horizontal conveyor means is pivotably and lockably or securely connected to a further elevating or inclined conveyor means by means of the side walls 11 and by means of bearing plates 32, said conveyor member being provided for raising the mouldings produced by the injection moulding machine to above the conveying level. The elevating conveyor means is formed from component parts which are substantially identical to the component parts of the already described horizontal or generally horizontal conveyor means. The bearing plates 32 abut against the web regions 11e and 11e' of the side walls 11 and 11' of the horizontal conveyor means and the elevating conveyor means. The axles 14 and 14' of the driven drums 17 and 17' of the horizontal conveyor means and elevating conveyor means are accommodated by the bearing plates 32, as is axle 35 of an intermediate wheel 36 which meshes with the drum spur wheels 16' and 16" of the horizontal and the inclined conveyor means. The intermediate wheel 36 extends through the lower longitudinal edge 11a of the side wall 11 of the horizontal conveyor means via the slot 33 and extends through an upper longitudinal edge 11b' of the side wall 11' of the inclined conveyor means via a slot 33', as is apparent from FIG. 10. The axles 14, 14' and 35 are securely connected to the bearing plates 32 by means of screws or bolts 31, 31' and 31" disposed on the end face thereof; said bolts extending through the bearing plates 32 and axially engaging in threaded or tapped bores formed in said axles. The screws or bolts 31 and 31" press the bearing plates 32 onto the side walls 11. In order to centre the inclined conveyor means in alternative pivotal positions, indentations 32a in the bearing plates 32 engage in appropriate recesses in the webs 11e of the discharging horizontal conveyor means. The ball bearing 37 (race) of the intermediate wheel 36 rests on an end journal 35a of the axle 35, while the ball bearings 15 and 15' (races) of the drum spur wheels 16' and 16" rest on the journals 14a and 14a' of the axles 14 and 14'.

The recesses 40 (FIG. 9) are in the form of slots and permit displacement to be effected for the tensioning of the conveyor belt by means of the tensioning device 19 and 14. The indentations 32a' in the bearing plates 32 engage in appropriately-formed recesses 40' provided in the side walls 11'. According to the pivotal position of the inclined conveyor means, four indentations 32a' engage in other respective recesses 40' (FIG. 2). A baffle or close-off plate 39 is pivotably mounted on a protective plate 34 above the drums 17' of the inclined conveyor means by means of the bolt 38. Under the action of gravity, the close-off plate 39 abuts tangentially against the conveyor belt 18' over its entire width and permits the transverse ribs 18m of the conveyor belt 18' to slip therethrough, said ribs 18m serving as carrier members. The close-off plate ensures that no mouldings slip down rearwardly from the conveyor belt 18'.

The liftins or inclined conveyor means can be connected to, or detached from, the discharging horizontal conveyor means without a considerable amount of work being involved. Therefore, to reduce his investment costs, the customer for the machine will in many cases only buy the inclined conveyor means at a later date, that is to say, if it is required.

I claim the following:

1. A conveyor assembly adapted for use as a parts discharge conveyor in the machine base of an injection molding machine, the conveyor assembly comprising in combination:

an elongated, generally horizontally oriented conveyor frame having a centrally located core portion formed of at least one longitudinal frame member extending in the direction of conveyance;

an endless conveyor belt looping around the core portion of the conveyor frame, the conveyor belt having an upper belt run moving above and being supported by said core portion and a lower belt run moving below said core portion;

a belt-reversing driven belt drum oriented transversely to the conveyor frame and supported by the conveyor frame in the vicinity of one of its longitudinal extremities;

a belt-reversing idling belt drum oriented parallel to the driven belt drum and supported by the conveyor frame in the vicinity of the other one of its longitudinal extremities;

a non-rotating drum shaft supporting the driven belt drum by means of bearings which are arranged in the vicinity of the axial extremities of the drum shaft, the drum shaft having its axial extremities vertically supported and horizontally guided in the conveyor frame in such a way that the drum shaft is displaceable relative to the conveyor frame in the longitudinal direction of said frame;

belt tensioning means supported by the conveyor frame and operable to forcibly displace the drum shaft in relation to the conveyor frame so as to change the longitudinal distance between the driven belt drum and the idling belt drum for belt tension adjustments;

a spur gear arranged on one extremity of the driven belt drum and rotationally connected thereto;

a drive motor having a housing and a drive shaft, the axis of the drive shaft being oriented parallel to the axis of the driven belt drum, the drive shaft carrying a drive pinion in meshing engagement with said spur gear on the driven belt drum, the drive motor being located longitudinally between the two belt-reversing drums and vertically between the upper and lower runs of the conveyor belt; and a supporting arm forming a bearing portion and a supporting flange on opposite ends of the arm, the bearing portion engaging the drum shaft between the spur-gear-carrying extremity of the driven belt drum and the associated extremity of the drum shaft, the supporting flange being attached to the housing of the drive motor, thereby securing the drive motor to the drum shaft.

2. A conveyor assembly as defined in claim 1, wherein the belt tensioning means includes two horizontally oriented threaded bores in the drum shaft, said bores extending radially through the drum shaft near its two extremities; and the belt tensioning means further includes two cooperating horizontally oriented belt tensioning bolts reaching into said threaded bores from the longitudinally outer side of the conveyor frame, the heads of the belt tensioning bolts being supported by vertical, transversely oriented portions of the conveyor frame.

3. A conveyor assembly as defined in claim 2, wherein the supporting arm engages the drum shaft with a bore in its bearing portion, in a juxtaposed relationship with one of said threaded bores in the drum shaft; and said bearing portion has a radial bore for the associated belt tensioning bolt in alignment with said threaded bore in the drum shaft.

4. A conveyor assembly as defined in claim 1, wherein the supporting arm engages the drum shaft with a bore in its bearing portion in such a way that the supporting arm is pivotable about the axis of the drum shaft; and the conveyor frame further includes means for vertically positioning the drive motor by vertically positioning the flange portion of the supporting arm.

5. A conveyor assembly as defined in claim 1, wherein the bearing portion and the supporting flange of the supporting arm are located on laterally opposite sides of the meshing drive pinion of the drive motor and spur gear of the driven belt drum; and said bearing portion and said supporting flange are joined by a bridge portion reaching transversely across the drive pinion and the spur gear in the vicinity of their meshing teeth.

6. A conveyor assembly as defined in claim 1, wherein the core portion of the conveyor frame includes a plurality of transversely oriented, longitudinally spaced U-shaped bars and upper and lower longitudinal frame members in the form of cover plates which are attached to the upper and lower sides of the U-shaped bars;

the conveyor frame further includes two side walls which are attached to the extremities of said U-shaped bars; and the side walls are sheet metal members, each having a vertically oriented central portion, a horizontal, laterally inwardly extending lower edge portion serving as a supporting ledge for the conveyor assembly and an inclined, laterally inwardly and downwardly extending upper edge portion serving as a parts guiding member on the upper side of the conveyor assembly.

7. A conveyor assembly as defined in any one of claims 1 through 6, further comprising a second conveyor structure which is similar to the first-described conveyor structure, the second conveyor structure including a conveyor frame, an endless conveyor belt, a belt-reversing driven belt drum and a belt-reversing idling belt drum supported by bearings on non-rotating drum shafts, and a spur gear on one extremity of the driven belt drum;

mounting means for adjustably attaching the second conveyor frame to the first conveyor frame in such a way that the two conveyor structures are arranged in a tandem configuration and the driven belt drum of the second conveyor structure is located in the vicinity of and below the driven belt drum of the first conveyor structure;

inclination adjusting means for setting the orientation of the second conveyor structure at any one of a plurality of upward inclinations, for the upper belt run of the second conveyor structure to raise the discharged parts above the level of the upper belt run of the first conveyor structure; and drive transmission means for transmitting the rotation of the driven belt drum of the first conveyor structure to the driven belt drum of the second conveyor structure in any one of its inclination settings.

8. A conveyor assembly as defined in claim 7, wherein said mounting means includes two mounting plates which are attached to the conveyor frames of both conveyor structures in the area of their driven belt drums and on opposite lateral sides thereof;

the spur gear on the driven drums of the second conveyor structure is arranged in longitudinal alignment with a spur gear on the driven belt drum of the first conveyor structure; and said drive transmission means includes an intermediate gear meshing with both of said spur gears on the driven belt drums of the two conveyor structures, the intermediate gear being carried by a shaft which is supported on at least one of the two mounting plates.

9. A conveyor assembly as defined in claim 8, wherein the conveyor frame of the second conveyor structure further includes two parallel side walls to which the two mounting plates of the mounting means are clampingly attached;

said inclination adjusting means includes a swivel connection between the conveyor frame of the second conveyor structure and the two mounting plates in the axis of the driven belt drum of the second conveyor structure, and said inclination adjusting means further includes, on a circle around the axis of the driven belt drum, a plurality of angularly regularly spaced detent formations in said clampingly attached side walls and mounting plates, the second conveyor structure being angularly adjustable from one detent formation to another, following the release of the clamping attachment between the second conveyor structure and the two mounting plates.

10. A conveyor assembly as defined in claim 7, wherein the conveyor belt of the second conveyor structure includes a plurality of conveying members in the form of transverse ribs; and the second conveyor structure further includes, in the area between the driven belt drums of the first and second conveyor structures, a plate-like baffle with a proximate end portion in biased contact with said conveyor belt of the second conveyor structure and a distal end portion pivotably supported on the mounting plates.

11. A conveyor assembly as defined in claim 1, wherein the idling belt drum is supported by bearings which are arranged on a non-rotating drum shaft, in the vicinity of the axial extremities of said shaft;

the two belt drums are substantially identical in structure, each drum being formed by a length of tubing and carrying on its extremities two identical spur gears which serve as end members for the belt drums and as hub portions for said bearings, while one of the four spur gears also serves as said drum-driving spur gear; and the drum-driving spur gear is axially spaced from the conveyor frame by the bearing portion of the supporting arm serving as a spacer member, and the three other spur gears are axially spaced from the conveyor frame by spacer bushes of an axial width which is equal to the axial width of said bearing portion.

12. The combination of a machine base of an injection molding machine with a conveyor assembly as defined in claim 1, wherein the machine base has an outside wall with a parts discharge opening therein;

the conveyor frame has a transverse width fitting the width of said parts discharge opening; and the conveyor assembly forms a self-contained unit, having all its component parts arranged within the outline of, and supported by the conveyor frame, so that the conveyor assembly is insertable into and removable from the machine base through said parts discharge opening.

* * * * *